INVENTOR.
BRIAN W. HOWALD
BY John Howard Smith
ATTY

United States Patent Office 3,387,141
Patented June 4, 1968

3,387,141
CONSTANT VOLTAGE BATTERY SYSTEM
Brian W. Howald, Amherst, Ohio, assignor to Lorain
Products Corporation, a corporation of Ohio
Filed Oct. 12, 1964, Ser. No. 403,101
12 Claims. (Cl. 307—49)

ABSTRACT OF THE DISCLOSURE

A constant voltage battery system including a battery charger having an input for connection to A-C source and having its output connected across a battery which is in turn connected across a load, the battery charger having a normal and equalize switch. An auxiliary D-C to D-C source of power is provided to additively compensate for change in battery voltage so that the sum of the D-C to D-C source voltage and that of the battery is supplied to the load at a constant level. There is provided a low voltage detecting means, a voltage sensing means for the D-C to D-C auxiliary supply and a low voltage cutoff means to disconnect the load from the battery when the battery voltage drops below a predetermined, discharged level. The system operates in three modes. First, when the charger is in operating condition and the A-C source is satisfactory, a battery connect contactor is closed to connect the battery and the charger across the load, the charger holding the battery in float voltage condition and supplying the load. Second, if either the A-C source or the charger become inoperative, and as battery voltage drops, the low voltage detecting means disconnects battery-load connect means, connects power supply-load connect means and connects power supply energizing means whereby battery energy and converter energy are combined to supply the load. A sensing circuit control is the output of the converter to maintain this combined energy at the voltage level called for by the load. Should the battery voltage drop to a discharged level the low voltage cutoff means disconnects the converter from the load and thus deenergizes the system to prevent battery damage. Third, should the normal-equalize switch be thrown to the higher than normal-equalize voltage for equalizing the battery, a voltage dropping element, in series with the rectifiers of the converter is cut into the circuit to reduce the load voltage to a desired, predetermined voltage during the equalize operation.

Figure 1:
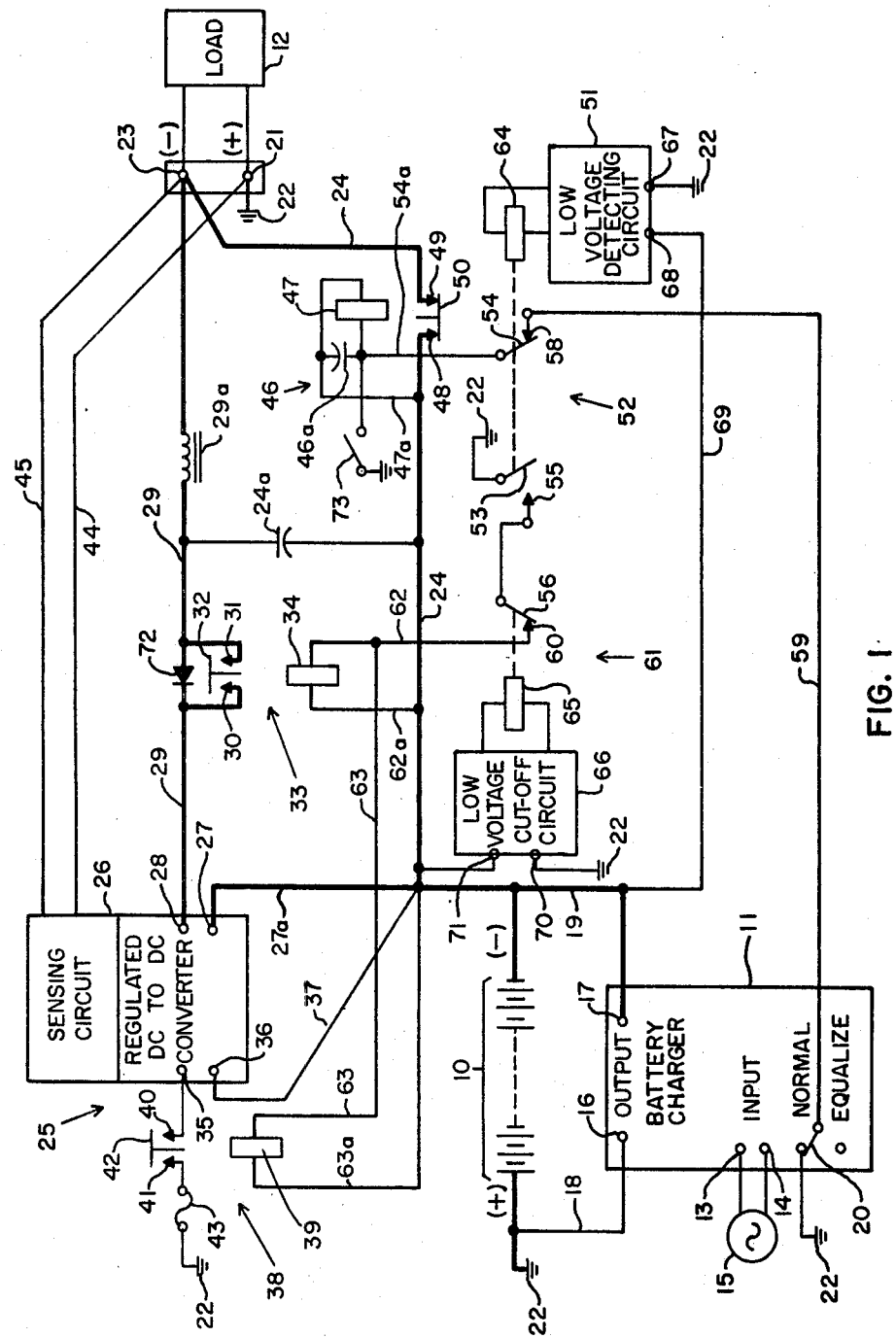

This invention relates to battery systems and is directed more particularly to circuitry for maintaining the voltage supplied to loads from a battery at a constant value.

Generally in telephone systems the loads or circuit to be energized are connected across a battery of wet cells. A battery charger operated from A-C line power is also connected across the battery and is adjusted to apply a precise voltage of, for instance, 2.15 volts per cell float voltage to the battery. While the battery is in a fully charged condition, the current required by the loads will be drawn from the charger. This may be considered as a normal or first mode of operation.

In the event of failure of the line power, the charger will supply no output current and consequently current for the loads will be supplied by the battery. As the battery discharges, its terminal voltage will drop and after a time some of the equipment or loads operated therefrom will cease to function properly because of the low battery voltage. As an example, the regulated output voltage of a D-C to D-C converter may be lower than an acceptable minimum value.

In the past it has been the practice to insert additional cells serially between the battery and the load, as required, to prevent the load voltage from dropping below a predetermined value. The insertion of these additional or end cells each time the battery voltage decreases to a predetermined value causes the voltage supplied to the loads to fluctuate undesirably. Additionally, either a separate charger must be provided to recharge these end cells when line power is restored or provision for end cell charging must be incorporated in the main battery charger.

Accordingly, it is an object of the invention to provide circuitry which, in a second mode, maintains the voltage delivered to a load from a battery at a constant, prescribed value without the use of end cells when the battery voltage drops below a predetermined magnitude.

It is another object of the invention to automatically begin a second mode of operation and insert the D-C output voltage of a regulated D-C to D-C converter between the battery from which it operates and a load to supply to the load in a compensatory manner the difference between the battery voltage and that required by the load when the battery voltage becomes less than a predetermined value.

A further object of the invention is to provide circuitry of the above character in which a low voltage detector de-energizes a relay when the battery voltage drops below a predetermined value whereby the relay contacts remove the energizing voltage from a battery connect contactor and connect energizing voltage to a power supply energizing contactor and in which the low voltage detector energizes the relay when the voltage becomes greater than the predetermined value.

It is an additional object of the invention to provide circuitry which de-energizes the D-C to D-C converter when the battery approaches a discharged condition whereby the rectifiers of the D-C to D-C converter limit the current flowing between the battery and the load to a negligible value to minimize further discharge of the battery.

Frequently the plates of lead-acid batteries become sulfated and the battery, if discharged, will not recharge properly in that some cells will attain greater voltage than others. This sulfation may be broken down by applying a higher than normal equalize voltage, for instance 54 volts or 2.33 volts per cell, to a 23 cell battery. Many battery chargers used in the telephone industry are provided with a normal-equalize switch to facilitate the equalizing operation. The equalize voltage applied to the battery may be unsuitably high for loads which are to operate from a battery having a terminal voltage of 50 volts. For example, the output voltage of a D-C to D-C converter designed to operate from a 48 to 52 volt source may exceed a maximum allowable value when the battery potential is 54 volts.

To prevent excessive voltage from being supplied to the loads when the battery charger is set to equalize voltage, voltage dropping elements are sometimes connected between the battery and the loads. These voltage dropping elements may be in the form of resistors, selenium counter EMF cells, silicon counter EMF cells or wet-type counter cells. As will be seen presently, the circuitry embodying the present invention reduces the required number of such voltage dropping elements.

It is an object of the invention to provide circuitry which maintains the voltage delivered to a load from a battery at a prescribed value when the battery is being either discharged or equalized.

It is another object of the invention to provide circuitry which automatically functions in a second mode, to maintain the load voltage at a constant, prescribed value when the battery voltage drops below a predetermined magnitude or when the battery is being charged under equalizing conditions in a third mode.

It is a further object of the invention to automatically insert the D-C output voltage of a regulated D-C to D-C converter between the battery from which it operates and a load to supply to the load in a compensatory manner the difference between the battery voltage and that required by the load when the battery voltage becomes less than a predetermined value and to automatically de-energize the D-C to D-C converter and connect the rectifiers thereof serially between the battery and the load when a battery charger connected across the battery is adjusted to charge the batteries at equalize voltage.

Yet another object of the invention is to provide circuitry of the above character in which the battery connect contactor will be de-energized when the battery charger is switched to an equalizing or third mode of operation in which current supplied to the load from the battery will be directed through the rectifiers of the D-C to D-C converter and a CEMF cell or other suitable voltage dropping component.

Thus, in the third mode of operation the voltage dropped across the rectifiers of the D-C to D-C converter by the current flowing between the load and the battery is supplemented by the potential drop across the voltage dropping element to prevent more than a prescribed voltage from being applied to the load. By utilizing the rectifiers of the D-C to D-C converter in this manner, the size of the CEMF cell may be reduced or one or more elements thereof may be eliminated.

Figure 2:
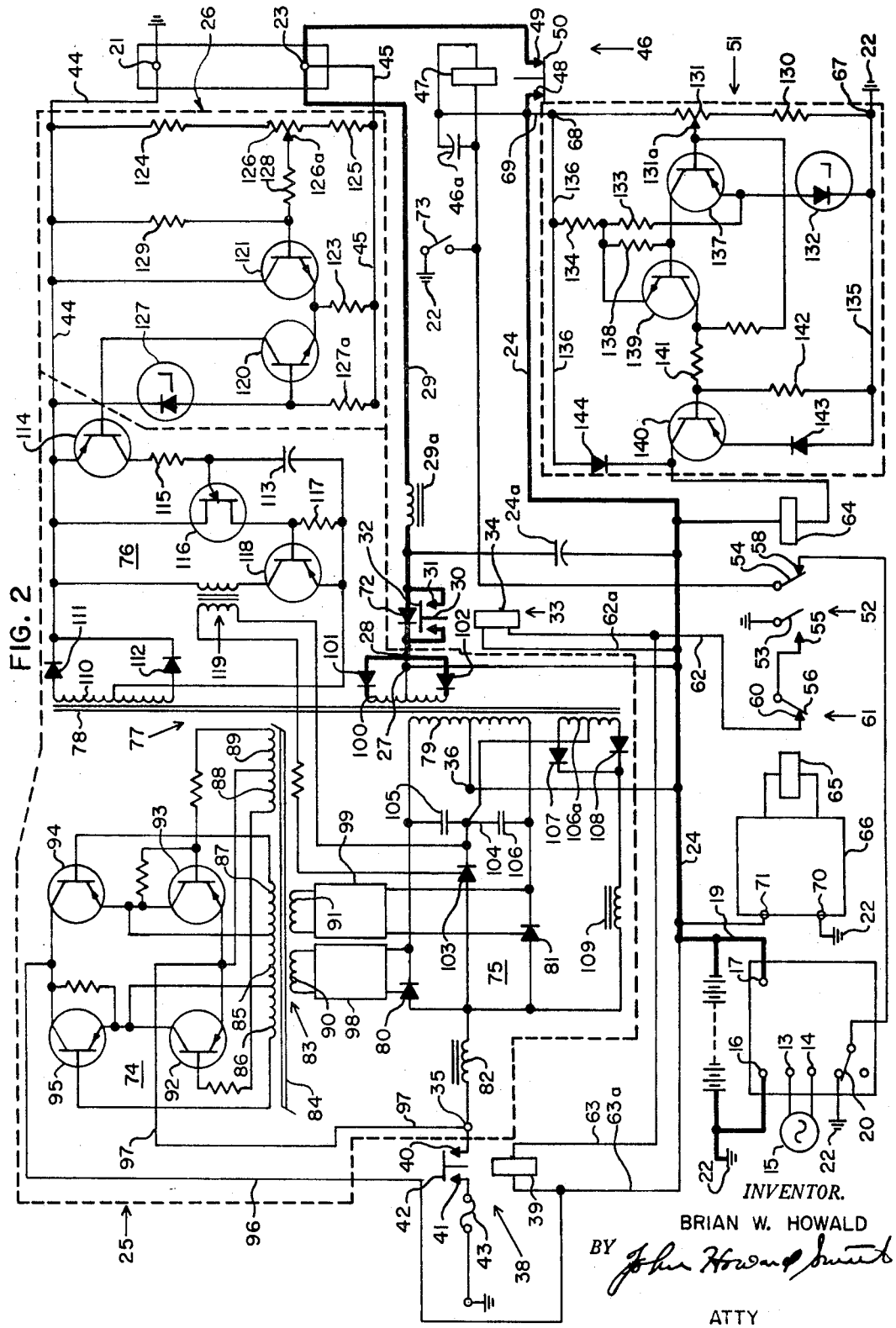

Other objects and advantages of the invention will become apparent from the following description and accompanying drawings in which:

FIGURE 1 is a combination block diagram and schematic of the circuitry embodying the invention and, FIGURE 2 is a schematic diagram illustrating exemplary circuits utilized in portions of the circuitry shown in FIGURE 1.

Referring to FIGURE 1 it will be seen that the circuitry embodying the invention may include a main D-C source or battery 10, a battery charger 11 and a load 12. The charger is provided with input terminals 13 and 14 connected to a suitable A-C source 15, as for example line power, and output terminals 16 and 17 which are connected to the positive pole and the negative pole of the battery 10 through leads 18 and 19, respectively. The charger also includes a normal-equalize switch 20, the purpose of which will be described presently.

The load 12 is connected across the battery 10 by connecting the positive pole of the battery and a terminal 21 to which the load is connected to a common ground 22 and by connecting the negative pole of the battery to a negative terminal 23, also connected to the load, by means of a lead 24. Assuming that the battery 10 is fully charged and that the A-C source 15 is supplying power to the charger, current will flow from the output terminal 16 to ground 22 through the lead 18 and from ground 22 through the terminal 21, the load 12, the terminal 23 and the lead 24 to the negative pole of the battery. If the battery 10 consists of, by way of example, 23 fully charged lead-acid cells, the voltage appearing between the terminals 21 and 23 will be 50 volts. Under the foregoing conditions the circuitry may be considered to be in a first mode of operation.

In the event of failure of either the A-C source 15 or the battery charger 11, no current will be supplied to the load from the charger. Consequently, the battery voltage will decrease as current is supplied to the load by the battery 10. To the end that in a second mode of operation the exemplary potential of 50 volts will be maintained between the terminals 21 and 23 as the battery discharges, there is provided a D-C to D-C converter 25 or auxiliary D-C source which may include a sensing circuit 26. The converter 25 operates in a compensatory manner to supply the difference between battery voltage and the exemplary 50 volt potential. An output terminal 27 of the D-C to D-C converter is connected to negative battery potential on the lead 24 while an output terminal 28 is connected to the terminal 23 through a lead 29. The fixed contacts 30 and 31 of a contactor 33 which is also provided with movable contact 32 and a winding 34 may be inserted in the lead 29 to provide for equalizing operation as will be explained presently. In a system where the equalizing operations or third mode is not utilized, the contactor 33 may be eliminated. The contactor 33, where employed, serves as a power supply connect means.

Energizing voltage for the D-C to D-C converter 25 is applied to input terminals 35 and 36 provided thereon, the latter terminal being connected to the negative battery lead 24 through a lead 37. In order to apply positive battery potential to the input terminal 35 there is provided a contactor 38 which includes a winding 39, fixed contacts 40 and 41 and a movable contact 42. Contact 40 is connected to the input terminal 35 of the D-C to D-C converter and the contact 41 is connected to the common ground 22 through a suitable fuse 43. The contacts 40 and 41 with the movable contact 42 may be considered as power supply energizing means.

The D-C to D-C converter 25 may typically have an output voltage range from 0–10 volts. This output is controlled by the sensing circuit 26 which is connected to the terminals 21 and 23 by means of the leads 44 and 45, respectively. The sensing circuit 26 adjusts the output voltage of the D-C to D-C converter to supply the necessary voltage to maintain a 50 volt potential between the terminals 21 and 23 when the battery 10 is being discharged by the load 12 due to failure of the battery charger and the battery voltage is below a predetermined magnitude.

When the D-C to D-C converter 25 is to be used in a compensatory manner to correct the voltage being applied to the load 12 from the battery 10, as it is in the second mode of operation, the direct connection between the battery and the load must first be opened, the converter 25 must be energized and the output terminals 27 and 28 of the converter must be connected between the battery and the load. To the end that the lead 24 may be opened there is provided a contactor 46 having a winding 47, fixed contacts 48 and 49 and a movable contact 50. The contacts 48 and 49 are connected in the lead 24 and thus the contactor 46 serves as battery connect means. It will be seen that when the contactor 46 is energized, the movable contact 50 will be pulled up against the contacts 48 and 49 and the battery will be connected directly to the load through the lead 24 and the terminal 23. When the contactor 46 is de-energized the contact plunger 50 will be released thereby opening the lead 24.

A capacitor 46a may be connected across the winding 47 of the contactor 46 to delay the opening thereof. This delay permits the output voltage of the converter 25 to build up before the lead 24 is opened.

Battery power will be supplied to the input terminals 35 and 36 of the D-C to D-C converter when the contactor 38 is energized causing the movable contact 42 to be pulled down against the contacts 40 and 41. When the contactor 33 is energized, the movable contact 32 will be pulled down against the contacts 30 and 31 and the output terminals 27 and 28 of the converter will then be connected between the battery and the terminal 23.

To the end that the contactors 33 and 38 will be energized and the contactor 46 will be de-energized if the battery voltage becomes less than a predetermined value, as for example less than 48 volts, there is provided a low voltage detecting circuit 51 which may include a suitable relay 52. The relay 52 is provided with contact arms 53 and 54 and contacts 55 and 58. The contact 58 is connected to the normal-equalize switch 20 on the charger 11 through a lead 59 and is accordingly grounded when the switch 20 is in the normal position as shown.

The contact arm 53 of the relay 52 is connected to ground while the contact arm 54 is connected to the winding 47 through a lead 54a, the other side of winding 47 being connected to the lead 24 through a lead 47a. The contact 55 is connected through a contact arm 56 and a contact 60 of a relay 61 and lead 62 and 63 to the windings 34 and 39, respectively, of the contactors 33 and 38. The relay 52 is provided with a winding 64 connected to the low voltage detecting circuit 51 and the relay 61 includes a winding 65 connected to a low voltage cut-off circuit 66. This cut-off circuit and the relay 61 function to prevent complete discharge of the battery 10 as will be explained presently.

Where there is no prohibition against fully discharging the battery, the relay 61 and the low voltage cut-off circuit 66 may be omitted. In such a case, the lead 63 would be connected directly to the contact 55 of the relay 52. Also, if the contactor 33 is to be utilized in the circuit, the lead 62 would be connected to the contact 55.

The low voltage detecting circuit 51 and the low voltage cut-off circuit 66 control the operation of the contactors 33, 38 and 46 through the operation of the relays 52 and 61 by monitoring the voltage of the battery 10. This continuous checking of the battery voltage is accomplished by connecting an input terminal 67 of the low voltage detecting circuit 51 to ground 22 and by connecting an input terminal 68 of that circuit to the lead 19 through a lead 69. Input terminals 70 and 71 provided on the low voltage cut-off circuit 66 are connected to grounds 22 and to the lead 24, respectively.

A suitable silicon diode or voltage dropping element may be connected between the contacts 30 and 31 of the contactor 33 to supplement the voltage dropping function of the rectifiers of the converter 25 when the third or equalizing mode is to be used. However, both the diode 72 and the contactor 33 may be removed from the circuit, leaving lead 29 unbroken, where no equalizing operation is to be performed. A switch 73 connected between the lead 54a and ground may be manually closed to energize contactor 46 thus connecting the battery directly to the load and overriding the control of the low voltage detecting circuit 66.

The operation of the foregoing circuitry will now be described with respect to the first and second modes of operation. The contactor 33 and the diode 72 are not required in a constant voltage battery system of the character described herein where only the first or normal and second or battery boost modes of operation are utilized. However, since the contactor 33 and the diode 72 when incorporated in the circuit function during the second mode, their operation will be explained in conjunction therewith.

Assuming that the battery 10 is fully charged and that input power is being supplied to the charger 11 from the A-C source 15, the low voltage detecting circuit 51 will supply current to the winding 64 to energize the relay 52 and the low voltage cut-off circuit 66 will supply current to the winding 65 to energize the relay 61. When these relays are energized, the contact arms 53 and 54 of the relay 52 and the contact arm 56 of the relay 61 take the positions shown in FIGURE 1. Because the contact arm 53 is pulled away from the contact 55 the leads 62 and 63 are open circuited and, consequently, no current is supplied to the windings 34 and 39 of the contactors 33 and 38, respectively. However, the contact arm 54 is being held against the contact 58 and, consequently, the winding 47 of the contactor 46 is connected to ground through the contact arm 54, contact 58, the lead 59 and the normal-equalize switch 20. This connection of the winding 47 to ground energizes the contactor 46 causing the movable contact 50 to be pulled up against the contacts 48 and 49 thereby establishing a direct connection between the negative pole of the battery and the terminal 23 by means of a lead 24. Under these conditions, the circuitry is in the first mode of operation and the load 12 is connected directly across the battery 10. Consequently, current will be suppplied to the load from the battery charger.

If, now, the charger fails to supply output current, the load 12 will draw current from the battery and the voltage thereof will begin to fall. By having the low voltage detecting circuit 51 adjusted to energize the relay 52 when the battery voltage is greater than, for example 48 volts, it will be seen that when the battery voltage falls below the 48 volt level relay 52 will be de-energized and the contact arms 53 and 54 will move into positions against the contact 55 and removed from the contact 56, respectively. When this occurs the connection of winding 47 to ground opens, after a slight delay produced by the capacitor 46a, since the contact arm 54 is no longer pulled against contact 58. Consequently, the contactor 46 de-energizes releasing the movable contact 50 so that the direct connection of the battery to terminal 23 by means of a lead 24 is opened.

At the same time, the positioning of contact arm 53 against the contact 55 connects the windings 34 and 39 of the contactors 33 and 38, respectively, to ground and, therefore, across the battery 10. This causes the movable contact 32 of the contactor 33 to be pulled against the contact 30 and 31 to connect the output terminal 28 of the D-C to D-C converter to the terminal 23 by means of lead 29. The energization of contactor 38 causes the movable contact 42 to be pulled against the contacts 40 and 41 thereby connecting the input terminal 35 of the D-C to D-C converter to ground 22 through the fuse 43. The circuitry is now operating in a second mode.

With the D-C to D-C converter 25 energized and its output terminal 28 connected to the terminal 23, it will be seen that current flows from the positive pole of battery 10 to ground 22 and from ground 22 through terminal 21, load 12, terminal 23, lead 29, the contact 31, the movable contact 32, contact 30, the output terminals 28 and 27 of the D-C to D-C converter and lead 27a to the negative pole of the battery. From this current flow path it will be seen that the output voltage of the D-C to D-C converter appearing between the output terminals 27 and 28 is added to the battery voltage and the total of these two voltages appears at the terminals 21 and 23 and, therefore, on the load 12.

The output voltage of the D-C to D-C converter is controlled by the sensing circuit 26 which detects the voltage at terminals 21 and 23 through the leads 44 and 45, respectively. This output voltage is adjusted by the sensing circuit to supply the magnitude of voltage necessary to maintain the load voltage at 50 volts as the battery voltage decreases below the 48 volt value at which the second mode of operation began. Thus, in a second mode, the load voltage is maintained at a prescribed magnitude as the battery discharges.

In a system such as that described herein the output voltage of the D-C to D-C converter may be variable, by way of example, from zero to 10 volts. Accordingly, if the battery voltage drops below 40 volts and the maximum voltage supplied by the converter is 10 volts, the voltage between the terminals 21 and 23 will decrease correspondingly from the prescribed 50 volt value. For example, the battery potential has dropped to 37 volts, no more than 47 volts can be supplied to the load since the converter output is a maximum of 10 volts. This voltage is insufficient for certain loads.

It will also be seen that when the voltage of a 23 cell lead-acid battery has dropped to 40 volts, the voltage of each cell is only 1.74 volts and the battery may be considered to be in a substantially discharged condition. Accordingly it is sometimes desirable to minimize further discharge of the battery 10 when the voltage thereof drops below 40 volts.

To the end that the battery 10 will not be further discharged after its voltage drops to 40 volts the low voltage cut-off circuit 66 may be provided if desired. The input terminals 70 and 71 of this cut-off circuit are connected across the battery 10 as described previously. The low voltage cut-off circuit 66 may be adjusted to de-energize the relay 61 when the battery voltage drops to, for example, 40 volts. When the relay 61 de-energizes, the contact arm 56 will be released from the contact 60 thus opening the connection of windings 34 and 39 to ground through the contact 55 and the contact arm 53. Hence, if the battery voltage attempts to drop below the minimum permissable voltage value, as for example below 50 volts, the relay 61 will release the contact arm 56 causing the contactors 33 and 38 to de-energize. This removes the input power from the D-C to D-C converter and opens the current bypass path around the diode 72 in the lead 29 which connects the output terminal 28 of the converter to the terminal 23.

With the contactor 33 open, the contactor 46 having been previously opened, current returning to the negative side of battery 10 from the load 12 via the terminal 23 flows through the lead 29, the diode 72, the rectifiers of the converter 25 and the lead 27a. Due to the potential drop across the rectifiers and the diode 72, the voltage appearing across the load 12 is less than the battery voltage and, consequently, the current drawn from the battery 10 by the load 12 will be lower. Thus, operation of the low voltage cut-off circuit reduces the current drain of the battery to less than that which would be drawn by the load alone.

From the foregoing it will be seen that if a low voltage cut-off circuit 66 and relay 61 are incorporated in the circuitry, the rectifiers of the converter 25 serve advantageously to minimize the current drawn by the load 12. If the diode 72 is inserted in the lead 29 for use in the third mode, the current drawn from the battery 10 by the load 12 will be still lower.

As indicated previously, it is sometimes desirable to apply equalize voltage to a battery. With regard to a load which is restricted to a maximum input of, for example, 52 volts, the equalize voltage, which is approximately 54 volts for a 23 cell battery is excessive. Accordingly, voltage dropping elements may be inserted in the current path between the battery and the load.

It is an advantage of the circuitry embodying the invention that the rectifiers of the converter 25 are employed as voltage dropping components during the equalize or third mode of operation. However, a CEMF cell or diode 72 may also be connected in the lead 29, as shown in FIGURE 1, to provide any additional voltage drop required to prevent more than 50 volts from being applied to the load 12.

The operation of the circuitry in the third mode will now be described. In this mode the contactor 33 and the diode 72, which are not required in the first and second modes of operation, may be connected in the lead 29 as indicated previously.

Assuming that the battery charger 11 is applying 50 volts across the battery, the relays 52 and 61 will be energized and the contact arms 53, 54 and 56 will be positioned as shown in FIGURE 1. If, then, conditions requiring an equalize charge are found to prevail, the normal-equalize switch 20 is moved to the equalize position thereby disconnecting the contact 58 of the contactor 46 from ground. Consequently, the winding 47 will be de-energized and as a result, the movable contact 50 will be released causing the lead 24 to be opened. With the switch 20 in the equalize position, the voltage applied to the battery by the charger will be approximately 54 volts. However, the load voltage will be maintained at 50 volts as will now be explained.

Because the movable contact 50 is released, the lead 24 is open and therefore, current flows from the positive pole of the battery to ground 22 and from ground 22 through the terminal 21, the load 12, the terminal 23, the lead 29 and the diode 72 to the output terminal 28 of the D-C to D-C converter. From the terminal 28, current flows through the rectifiers of the D-C to D-C converter 25, to be described in greater detail presently, terminal 27 and lead 27a to the negative pole of the battery.

The total voltage drop developed across the diode 72 and the rectifiers of the D-C to D-C converter 20 by the load current is sufficient so that only 50 volts is applied to the load 12 at the terminals 21 and 23 under equalize conditions. Hence, the rectifiers of the converter 25, with diode 72, keep the load voltage within limits when the battery 10 is being equalized. When the equalize switch is returned to the normal position, the contactor 46 will again be energized and the negative pole of the battery will be directly connected to the terminal 23 through the lead 24.

It will be understood that since the windings 34 and 39 of contactors 33 and 38, respectively, are connected in parallel and are energized simultaneously, these contactors may be replaced by a single contactor where both the second and third modes are to be used. For example, the movable contacts 32 and 42 of the contactors 33 and 38, respectively, may be arranged to be operated by a single winding if they are electrically insulated from one another.

Referring to FIGURE 2, there is shown exemplary circuitry which may be utilized to a device embodying the invention. Components shown in FIGURE 1 which correspond to those shown in FIGURE 2 are identified by like numerals. The D-C to D-C converter 25 may include an oscillator section 74, a quasi square wave generator section 75, a pulse generator section 76 and the previously described sensing circuit section 26. To form the quasi square wave generator 75 there is provided a transformer 77, having a core 78 with a center tapped primary winding 79 carried thereon and by connecting silicon controlled rectifiers 80 and 81 between opposite ends of the primary winding 79 and one of a commutating inductor 82, the other end of which is connected to the input terminal 35. The center tap of the primary winding 79 is connected to the input terminal 36.

In order to render the controlled rectifiers 80 and 81 alternately conducting to produce alternating current in the primary winding 79 of the transformer 77, the oscillator section 74 is provided. This oscillator may include, by way of example, a transformer 83 having a saturable core with a primary winding 85, feedback winding sections 86, 87, 88 and 89 and drive windings 90 and 91 carried thereon. Alternating current is caused to flow in the primary winding 85 by the transistors 92, 93, 94 and 95 which are connected in a bridge configuration and which are energized through a lead 96 connected to the lead 63a and through a lead 97 which is connected to the input terminal 35. By connecting the drive windings 90 and 91 between the gate and cathode electrodes of controlled rectifiers 80 and 81 through pulse forming networks 98 and 99, respectively, the alternate conduction of these rectifiers is effected.

The output voltage of the D-C to D-C converter 25 is developed across the output terminals 27 and 28 by means of an output winding 100 having a center tap connected to the output terminal 27. The opposite ends of the output winding 100 are connected through rectifiers 101 and 102 to the output terminal 28. The rectifying circuit thus established provides voltage at the output terminals 27 and 28 when current flows in the primary winding 79. Filtering for the D-C to D-C converter is provided by a choke 29a in the lead 29 and a capacitor 24a connected between the choke 29a and the lead 24.

In the third mode of operation as described previously, the rectifiers 101 and 102 of the converter 25 function as voltage dropping elements and thereby supplement the voltage dropping action of the diode 72 so that the voltage appearing between the terminals 21 and 23 will be less than the equalize voltage being applied to the battery 10 by the charger 11.

The voltage regulating action whereby the voltage between the output terminals 27 and 28 is maintained suitably in the exemplary 0–10 volt range is provided by connecting a silicon controlled rectifier 103 between the inductor 82 and the junction 104, common to the commutating capacitors 105 and 106 which are serially connected across the primary winding 79. Each time the controlled rectifier 103 is rendered conducting it terminates the conduction of whichever controlled rectifier, 80 or 81, is on and current ceases to flow in the primary winding 79 until either of the controlled rectifiers 80 or 81 is again rendered conducting.

For the purpose of providing voltage across the controlled rectifier 103 to enable it to turn on, there is provided a rectifier circuit which includes a winding 106a having a center tap connected to the junction 104. The other ends of the winding 106a are connected to the inductor 82 through rectifiers 107 and 108 and a filter choke 109.

In order to control the conduction of the controlled rectifier 103 whereby the conduction time of the controlled rectifiers 80 and 81 may be increased or decreased to correspondingly increase or decrease the output voltage, the pulse generator 76 is provided. This pulse generator is energized from a winding 110 carried on the core 78 of the transformer 77 through the rectifiers 111 and 112 only when one or the other of the controlled rectifiers 80 or 81 is conducting. Immediately upon the appearance of voltage across the winding 110, a timing capacitor 113 begins to charge through the emitter-collector path of a transistor 114 and a current limiting resistor 115. When the voltage across the capacitor 113 becomes sufficiently great, the unijunction transistor 116 will turn on causing a pulse of voltage to appear across a bias resistor 117.

This bias resistor is connected between the emitter and base electrode of a pulse amplifying transistor 118, the collector electrode of which is connected through the primary winding of a pulse transformer 119 to the rectifiers 111 and 112. Consequently, the pulse of voltage appearing across the resistor 117 turns the transistor 118 on thereby causing a pulse of current in the primary winding of the pulse transformer 119. The secondary winding of the pulse transformer is connected between the gate and the cathode electrode of the control rectifier 103, and therefore, each time transistor 118 conducts a voltage pulse is applied between the gate electrode and the cathode electrode of the controlled rectifier 103 causing it to turn on. Thus the pulses from the pulse generator 76 render the controlled rectifier 103 conducting and thereby terminate the conduction of either the controlled rectifier 80 or the controlled rectifier 81.

It will be seen that by advancing the occurrence of the pulse from the pulse generator 76, the conduction time of the controlled rectifiers 80 and 81 will be reduced and consequently the output voltage appearing at output terminals 27 and 28 will be decreased. If the occurrence of the pulse is retarded, the output voltage will be correspondingly greater. To the end that the occurrence of the pulse may be suitably advanced or retarded to produce the required voltage at the output terminals 27 and 28 there is provided a voltage sensing circuit section 26. This voltage sensing section controls the conduction of transistor 114 and thereby the charging time of the capacitor 113. If the conduction of the transistor 114 is high, the capacitor 113 will charge quickly and the pulse will be generated a short time after either of the controlled rectifiers 80 or 81 begins to conduct. If the conduction of transistor 114 is low, the capacitor 113 will charge slowly and the pulse will occur much later allowing a greater conduction time for the controlled rectifiers 80 and 81.

The voltage sensing circuit 26 may include, by way of example, a differential amplifier formed by transistors 120 and 121. The emitter-electrodes of the transistors 120 and 121 are commonly connected through a resistor 123 to the lead 45 while the collector electrodes thereof are connected to the base of transistor 114 and to the lead 44, respectively. In order to compare the voltage between the terminals 21 and 23 with a constant voltage reference, a voltage divider network including resistors 124 and 125 are serially connected with a potentiometer 126 between the leads 44 and 45. A Zener diode 127 and a resistor 127a are also serially connected between the leads 44 and 45 and provide the reference voltage. The base electrode of the transistor 120 is connected as shown to the upper end of the resistor 127a while the base electrode of the transistor 121 is connected to the wiper arm 126a of the potentiometer 126 through a resistor 128 to thereby effect a comparison of the voltage being sensed to the reference voltage. A resistor 129 connected between the lead 44 and the base electrode of transistor 121 serves to stabilize the operation of that transistor.

Assuming that the voltage between the terminals 21 and 23 tends to increase, the conduction of the transistor 121 will decrease causing the conduction of the transistor 120 and the transistor 114 to increase. This increase in conduction of the transistor 114 reduces the charging time of the capacitor 113 and, consequently, the unijunction transistor 116 will turn on earlier in each timing period thereby advancing the voltage pulse supplied to the controlled rectifier 103. The advancement of the pulses reduces the conduction time of the controlled rectifiers 80 and 81 and the voltage appearing at the output terminals 27 and 28 will be correspondingly reduced to cancel the voltage increase which would otherwise have appeared between the terminals 21 and 23.

If the voltage between the terminals 21 and 23 tends to decrease, the action of the transistors 120 and 121 will decrease the conduction of the transistor 114 to retard the pulse applied to the controlled rectifier 103. Accordingly, the conduction time of the controlled rectifiers 80 and 81 will be increased to increase the voltage appearing at the output terminals 27 and 28 of the D-C to D-C converter 25 by a suitable magnitude to prevent any decrease in the voltage between the terminals 21 and 23.

The low voltage detecting circuit 51 may include a voltage divider network having a resistor 130 and a potentiometer 131 connected between the input terminals 67 and 68. The constant voltage reference is established by connecting a Zener diode 132 and resistors 133 and 134 serially between the leads 135 and 136 which are connected to the input terminals 67 and 68, respectively. In order to compare the battery voltage appearing between the input terminals 67 and 68 to the constant voltage reference there is provided a transistor 137 having its emitter electrode connected, as shown, to the upper end of the Zener diode 132, its base electrode connected to a wiper arm 131a of the potentiometer 131 and its collector electrode connected to a point between the resistors 133 and 134 through a bias resistor 138.

It will be seen that if the voltage between the wiper arm 131a and the input terminal 67 is greater than the voltage across the Zener diode 132, a transistor 137 will conduct causing the voltage to be produced across the bias resistor 138. The amount of input voltage which will cause the transistor 137 to turn on may be selected by adjustment of the wiper arm 131a. Thus the wiper arm 131a may be positioned so that an input voltage greater than the exemplary 51 volt potential previously indicated with regard to the operation of the circuitry shown in FIGURE 1 will cause the transistor 137 to turn on.

In order that current will be supplied to the winding 64 of the relay 52 when the transistor 137 conducts, amplifying transistors 139 and 140 are provided in the low voltage detecting circuit 51. The emitter electrode and the base electrode of the transistor 139 are connected to opposite ends of the bias resistor 138 while the collector electrode is connected to the lead 135 through resistors 141 and 142. The base electrode of transistor 140 is connected to a point between the resistors 141 and 142 while the emitter electrode of that transistor is connected to the lead 135 through a biasing diode 143. Current flow is supplied to the winding 64 by connecting it between the lead 24 and the collector electrode of transistor 140.

From the foregoing it will be seen that when the transistor 137 conducts, voltage will be developed across the bias resistor 138. This voltage renders the transistor 139 conducting and the resulting voltage developed across the resistor 142 renders the transistor 140 conducting. When transistor 140 turns on current will flow from the ground 22 which is at positive battery potential, through the lead 135, the biasing diode 143, the emitter-collector path of the transistor 140 and the winding 64 of the relay 52 to the lead 24 which is at negative battery potential. Thus, when the input voltage becomes greater than the particular value as selected by the setting of wiper arm 131a, the transistors 137, 139 and 140 will conduct to energize the relay 52. In the event that the input voltage drops below the prescribed value, those transistors will turn off to de-energize the relay 52 whereby the D-C to D-C converter 25 is turned on and connected to maintain the constant voltage between terminals 21 and 23 as described previously.

The speed of response of the low voltage detecting circuit 51 may be increased by a feedback resistor connected between the collector electrode of the transistor 139 and the base electrode of the transistor 137. To protect the transistor 140 from voltage spikes which may occur when it turns off, a diode 144 may be connected between the collector electrode of that transistor and the lead 136.

The low voltage cut-off circuit 66 is identical to the low voltage detecting circuit 51 and, therefore, will not be described. The input terminals 70 and 71 of the low voltage cut-off circuit 66 correspond to the input terminals 67 and 68 of the low voltage detecting circuit and are connected across the battery 10. However, the low voltage cut-off circuit is adjusted to energize the relay 61 when the battery voltage is above, for example, 40 volts. Hence, as explained previously when the battery voltage drops below 40 volts the relay 61 will be de-energized by the low voltage cut-off circuit 66 thereby disconnecting the D-C to D-C converter 25 and the load from the battery.

From the foregoing it will be seen there is provided circuitry which maintains the voltage delivered to a load from a battery at a constant value after the battery voltage has dropped below a predetermined value. This circuitry also maintains the load voltage at the constant prescribed magnitude under equalizing conditions.

It will be understood that the embodiments shown herein are for explanatory purposes and may be changed or modified without departing from the spirit and scope of the invention as set forth in the claims appended hereto.

What I claim is:

1. In a circuit adapted to restore the voltage supplied to a load from a battery to a prescribed value after the battery voltage becomes less than a predetermined value and to maintain the load voltage at a constant magnitude as the battery discharges and further adapted to prevent the load voltage from becoming greater than the prescribed value under equalizing conditions, in combination, low voltage detecting means, battery connect means operably associated with said low voltage detecting means, means for connecting said battery connect means between the battery and the load, a regulated D-C power supply having output means and input means and responsive to the voltage of the load, power supply connect means operably associated with said low voltage detecting means, means for connecting said power supply connect means between said output means of said D-C power supply and the load, voltage dropping means, means for connecting said voltage dropping means between said output means of said power supply and the load, power supply energizing means operably associated with said low voltage detecting means, means for connecting said power supply energizing means between said input means of said power supply and the battery, equalize voltage means, means for connecting said equalize voltage means to said battery connect means.

2. In a constant voltage battery system which is normally energized from an A-C source to supply current to a load, in combination, a battery charger having input terminals, output terminals, and a normal-equalize switch, means for connecting said input terminals of said battery charger to the A-C source, means for connecting said output terminals of said battery charger across the battery, a D-C to D-C converter having a voltage sensing section, input means and output means including rectifying means, means for connecting said voltage sensing section of said D-C to D-C converter to the load, first, second and third contactors each including a winding, a movable contact and a pair of fixed contacts adapted to be electrically connected to one another by said movable contact when said winding is energized, means for connecting said fixed contacts of said first contactor between the battery and the load, means for connecting said fixed contacts of said second contactor between said output means of said D-C to D-C converter and the load, means for connecting said fixed contacts of said third contactor between said input means of said D-C to D-C converter and the battery, a relay having first and second contact arms and first and second contacts, means for connecting said first contact arms to said winding of said first contactor, means for connecting said first contact to said normal-equalize switch, means for connecting said second contact arm to ground, means for connecting said second contact to said winding of said second contactor, means for connecting said second contact to said winding of said third contactor, low voltage detecting means adapted to energize said relay when the battery voltage is greater than a predetermined value, unidirectional current conducting means, means for connecting said unidirectional current conducting means between said output means of said D-C to D-C converter and the load.

3. In a system adapted to maintain a constant voltage on a load which is connected across a battery, in combination, a D-C to D-C converter having a voltage sensing section, input means and output means including rectifying means, means for connecting said voltage sensing section of said D-C to D-C converter to the load, first, second and third contactors each including a winding, a movable contact and a pair of fixed contacts to be electrically connected to one another by the movable contact when the winding is energized, means for connecting the pair of fixed contacts of said first contactor between the battery and the load, means for connecting the pair of fixed contacts of said second contactor between said output means of said D-C to D-C converter and the load, means for connecting the pair of fixed contacts of said third contactor between said input means of said D-C to D-C converter and the battery, a low voltage detecting means including first means for connecting said winding of said first contactor across the battery when the battery voltage is greater than a predetermined magnitude and second means for connecting said windings of said second and third contactors across battery when the battery voltage is less than said predetermined magnitude, unidirectional semi-conductor means, means for connecting said unidirectional semi-conductor means between said output means of said D-C to D-C converter and the load, means for disconnecting said winding of said first contactor from the battery.

4. In a system for maintaining the voltage supplied to a load from a battery at a constant magnitude, low voltage detecting means, battery connect means controlled by said low voltage detecting means, means for connecting said battery connect means between the battery and the load, a D-C power source having variable output voltage, means for connecting said D-C power source between the battery and the load, said means being responsive to said low voltage detecting means, voltage sensing means adapted to control the output voltage of said D-C power source in a compensatory manner, means for connecting said voltage sensing means to said load, voltage dropping means, means for connecting said voltage dropping means in parallel with said means for connecting said D-C power source between the battery and the load, means for opening said battery connect means independently of said low voltage detecting means whereby current flowing between the battery and the load is directed through said D-C source and said voltage dropping element.

5. In a constant voltage battery system normally energized from an A-C source to supply current to a load, in combination, a battery charger energized from the A-C source and including a normal-equalize switch and output terminals, means for connecting said output terminals of said battery charger to the battery, a D-C to D-C converter having voltage sensing means, input means and output means including rectifying means, means for connecting said voltage sensing means to the load, a first contactor having a winding, a movable contact and a pair of fixed contacts, means for connecting said fixed contacts of said first contactor between the battery and the load, contactor means including a winding and first and second movable contacts each having a pair of fixed contacts associated therewith, means for connecting said fixed contacts associated with said first movable contact of said contactor means between said output means of said D-C to D-C converter and the load, means for connecting said fixed contacts associated with said second movable contact of said contactor means between said input means of said D-C to D-C converter and the battery, a relay having first and second contact arms and first and second contacts associated with said first and second contact arms, respectively, means for connecting said first contact arm of said relay to said winding of said first contactor, means for connecting said first contact of said relay to said normal-equalize switch, means for connecting said second contact arm of said relay to ground, means for connecting said second contact of said relay to said winding of said contactor means, low voltage detecting means adapted to energize said relay when the battery voltage is greater than a predetermined value, voltage dropping means, means for connecting said voltage dropping means between said output means of said D-C to D-C converter and the load.

6. In a constant voltage battery system having a battery charger and a load connected across the battery, in combination, a variable voltage D-C power source, voltage sensing means for controlling the voltage of the D-C power source, means for connecting said voltage sensing means to the load, first and second contactors each having a winding, and contact means which close when current is supplied to said winding, means for connecting said contact means of said first contactor between the battery and the load, means for connecting said contact means of said second contactor between said variable voltage D-C power source and the load, a low voltage detecting circuit including first and second contact means, means for connecting said low voltage detecting circuit to the battery, an equalize switch, means for serially connecting said equalize switch, said first contact means and said winding of said first contactor across the battery, means for serially connecting said second contact means and said winding of said second contactor across the battery, unidirectional current conducting means, means for connecting said unidirectional current conducting means between said D-C source and the load.

7. In a constant voltage system having a battery with a load connected thereto, in combination, a D-C source which is inoperative when battery voltage is above a predetermined value and the output voltage of which is controlled by a sensing circuit including first and second transistors each having an emitter electrode, a base electrode and a collector electrode, a voltage divider connected across the load, a Zener diode, a first resistor, means for serially connecting said Zener diode and said first resistor across the load, means for connecting said base electrode of said first transistor to a point between said Zener diode and said first resistor, means for connecting said base electrode of said second transistor to said voltage divider, a second resistor, means for connecting said emitter electrodes of said first and second transistors to one side of the load through said second resistor, means for connecting said collector electrode of said second transistor to the other side of the load, a pulse generator incorporated in said D-C source, means for connecting said collector electrode of said first transistor to said pulse generator whereby the pulses of said pulse generator are appropriately varied timewise to produce from said D-C source an output voltage which is the difference between the battery voltage and the desired load voltage, means for connecting said D-C source in circuit relationship with the battery and the load when the voltage becomes less than a predetermined value.

8. In a constant voltage system having a battery with a load connected thereacross, in combination, a D-C source which is inoperative when battery voltage is above a predetermined value and the output voltage of which is controlled in a compensatory manner by a sensing circuit including first and second transistors each having an emitter electrode, a base electrode and a collector electrode, a voltage divider connected across the load, a Zener diode, a first resistor, means for serially connecting said Zener diode and said first resistor across the load, means for connecting said base electrode of said first transistor to a point between said Zener diode and said first resistor, means for connecting said base electrode of said second transistor to said voltage divider, a second resistor, means for connecting said emitter electrodes of said first and second transistors to one side of the load through said second resistor, means for connecting said collector electrode of said second transistor to the other side of the load, a pulse generator incorporated in said D-C source, means for connecting said collector electrode of said first transistor to said pulse generator whereby the pulses of said pulse generator are appropriately varied timewise to produce from said D-C source an output voltage which is the difference between the battery voltage and the desired load voltage, means for connecting said D-C source in circuit relationship with the battery and the load when the voltage becomes less than predetermined value, low voltage cut-off means connected across the battery and adapted to de-energize said D-C source when said battery is substantially discharged.

9. In a constant voltage system including a battery having a load connected thereacross, in combination, a battery charger connected across the battery and capable of supplying equalizing voltage thereto, a D-C source having variable output voltage and being inoperative when battery voltage is above a predetermined value and being responsive in a compensatory manner to the load voltage, means for connecting said D-C source in circuit relationship with the battery and the load when the battery voltage becomes less than a predetermined value, voltage dropping means, means for connecting said voltage dropping means between the battery and the load when equalize voltage is applied to the battery by the battery charger.

10. In a system for supplying constant voltage to a load, in combination, a main D-C source connected across said load in a first mode, an auxiliary D-C source having a rectifier output circuit, said auxiliary D-C source being responsive in a compensatory manner to the voltage of the load in a second mode and inoperative in a third mode, means for connecting said auxiliary D-C source in the current path between the main D-C source and the load in the second and third modes, means for applying equalizing voltage to the main D-C source in the third mode, said auxiliary D-C rectifier output circuit serving to isolate the load from the equalized voltage of the main D-C source in the third mode.

11. In a circuit adapted to restore the voltage supplied to a load from a battery to a prescribed value after the battery voltage becomes less than a predetermined value and to maintain the load voltage at a constant magnitude as the battery discharges, in combination, low voltage detecting means, battery connect means operably associated with said low voltage detecting means, means for connecting said battery connect means between the battery and the load, a regulated D-C power supply having output means and input means and responsive in a compensatory manner to the voltage of the load, means for connecting said output means of said regulated D-C power supply between the battery and the load, power supply energizing means operably associated with said low voltage detecting means, means for connecting said power supply energizing means between said input means of said regulated D-C power supply and the battery whereby said regulated D-C power supply will be energized when the battery voltage is below a predetermined value.

12. In a constant voltage battery system including a battery and a load connected thereto, in combination, low voltage detecting means, battery connect means controlled by said low voltage detecting means, means for connecting said battery connect means between the battery and the load, a D-C power source having a variable output voltage, means for connecting said D-C power source between the battery and the load, voltage sensing means for controlling the output voltage of said D-C power source in a compensatory manner, means for connecting said voltage sensing means to said load.

References Cited

UNITED STATES PATENTS

| | | | |
|---|---|---|---|
| 2,897,433 | 7/1959 | Putkovich | 323—100 |
| 2,991,410 | 7/1961 | Seike | 323—100 |
| 3,009,093 | 11/1961 | Seike | 323—100 |
| 3,040,271 | 6/1962 | Murphy | 325—492 X |
| 3,192,464 | 6/1965 | Johnson | 321—18 X |
| 3,222,535 | 12/1965 | Engelhardt | 307—48 X |
| 3,293,446 | 12/1966 | Baude | 307—66 |
| 3,293,530 | 12/1966 | Baude | 307—66 X |

ORIS L. RADER, *Primary Examiner.*

T. J. MADDEN, T. B. JOIKE, *Assistant Examiners.*